(No Model.) 5 Sheets—Sheet 1.
E. B. PHILLIPS.
ELECTRIC MOTOR MECHANISM.
No. 474,857. Patented May 17, 1892.
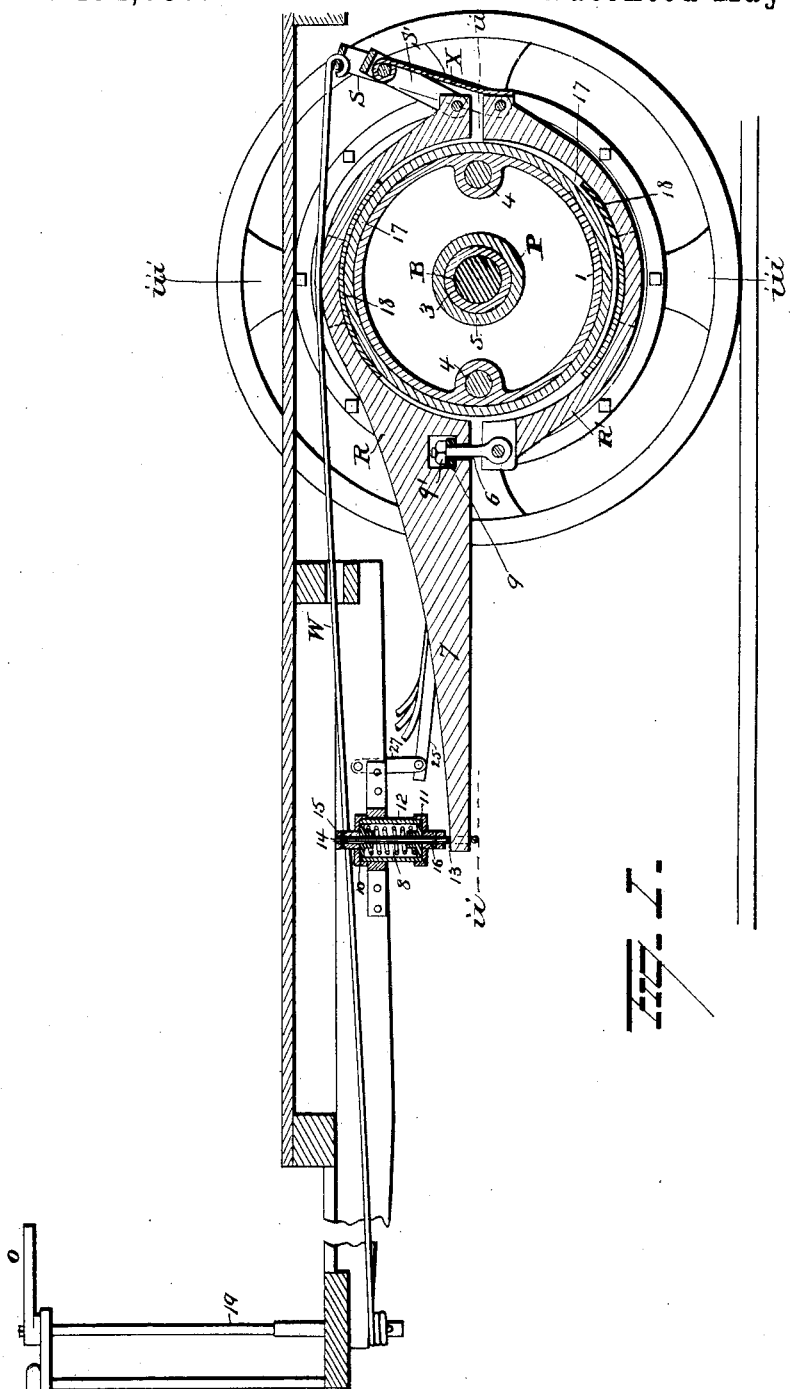

(No Model.)   5 Sheets—Sheet 2.
E. B. PHILLIPS.
ELECTRIC MOTOR MECHANISM.
No. 474,857. Patented May 17, 1892.
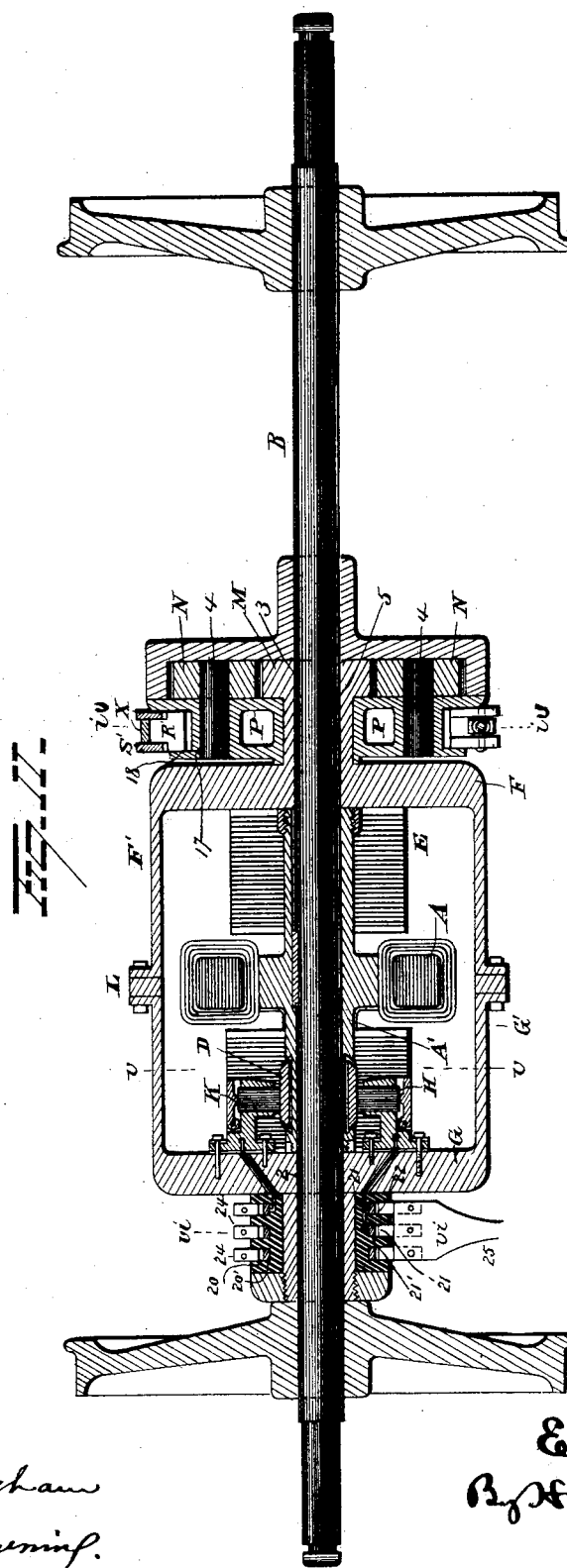
Witnesses
E. J. Nottingham
G. F. Downing
Inventor
E. B. Phillips
By H. A. Seymour
Attorney

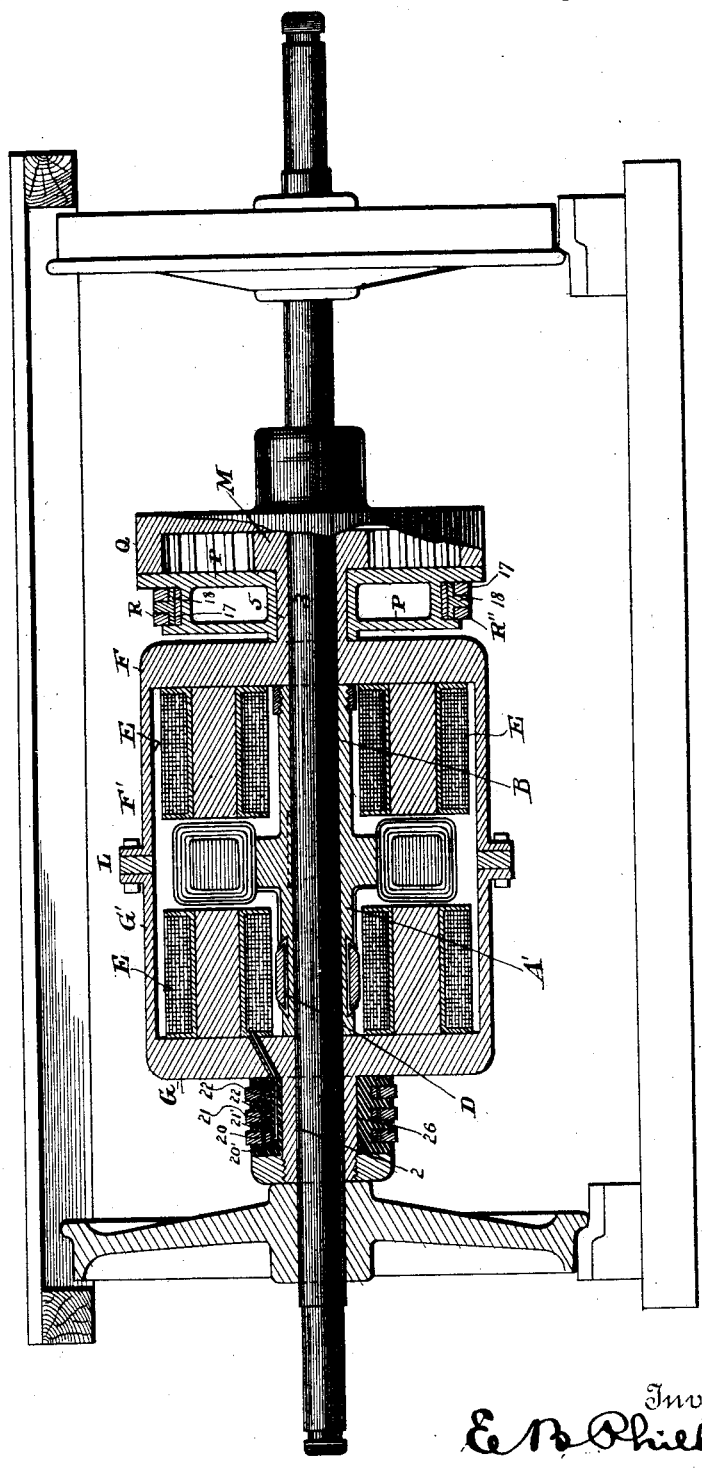

(No Model.) 5 Sheets—Sheet 4.
E. B. PHILLIPS.
ELECTRIC MOTOR MECHANISM.
No. 474,857. Patented May 17, 1892.
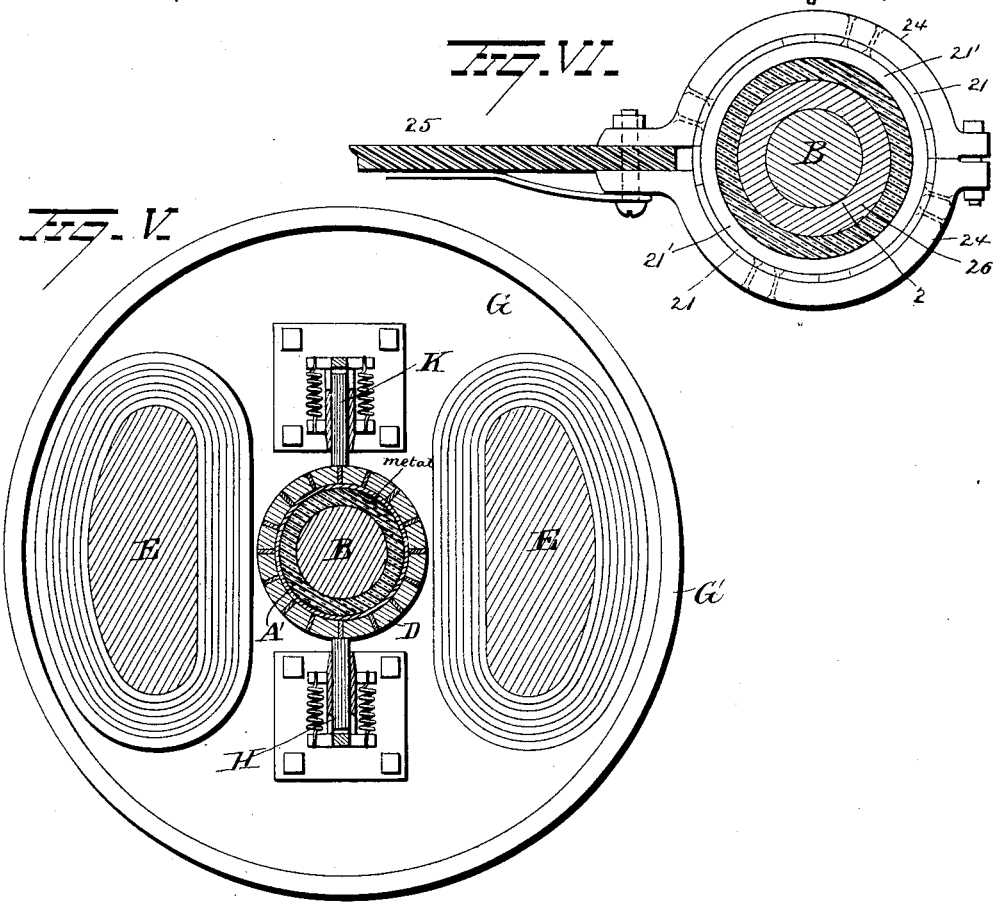
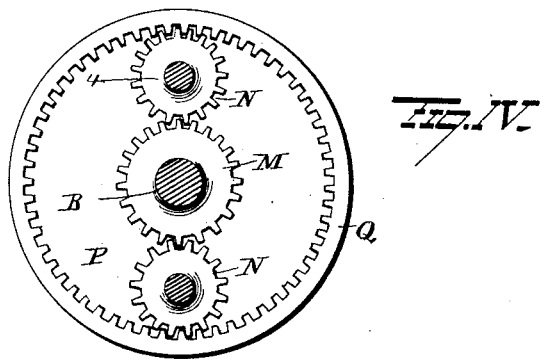
Witnesses
E. J. Nottingham
G. F. Downing
Inventor
E. B. Phillips
By H. A. Sugman
Attorney (No Model.) 5 Sheets—Sheet 5.
E. B. PHILLIPS.
ELECTRIC MOTOR MECHANISM.
No. 474,857. Patented May 17, 1892.
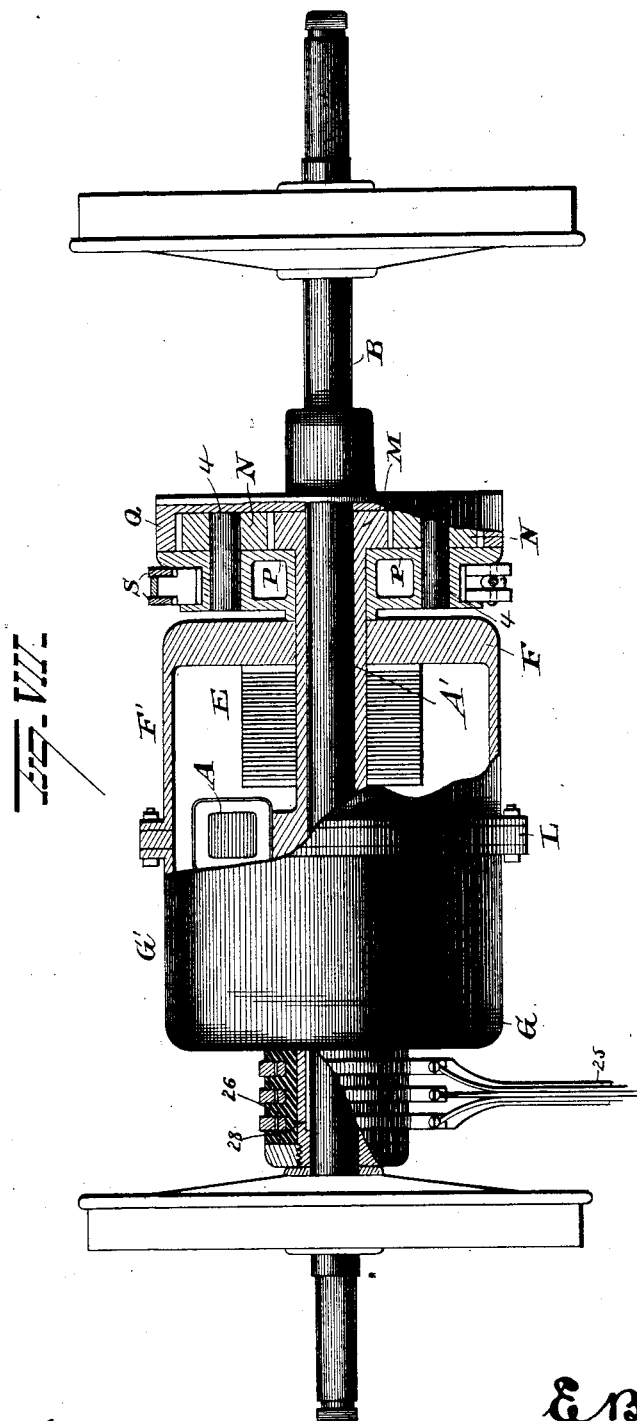
Witnesses
E. J. Nottingham
G. F. Downing
Inventor
E. B. Phillips
By H. A. Sugmon
Attorney
THE NORRIS PETERS CO., PHOTO-LITHO., WASHINGTON, D. C.

UNITED STATES PATENT OFFICE.

ELBERT B. PHILLIPS, OF CLEVELAND, OHIO.

ELECTRIC-MOTOR MECHANISM.

SPECIFICATION forming part of Letters Patent No. 474,857, dated May 17, 1892.

Application filed December 24, 1890. Serial No. 375,680. (No model.)

*To all whom it may concern:*

Be it known that I, ELBERT B. PHILLIPS, of Cleveland, in the county of Cuyahoga and State of Ohio, have invented certain new and useful Improvements in Electric-Motor Mechanisms for Railway and other Purposes; and I do hereby declare the following to be a full, clear, and exact description of the invention, such as will enable others skilled in the art to which it appertains to make and use the same.

This invention relates more particularly to electric-motor mechanisms for propelling cars on railways; but each of the improvements constituting the said invention is included for all the uses to which it may be adapted.

In accordance with the present invention the motor-armature is axially placed with reference to a driven axle, and the motor is connected with said axle through suitable gearing for rotating the same.

The invention extends to the use of any known or suitable motor or gearing in this connection; but a motor with the field-magnets at the sides of the armature has advantages, in that the motor is or may be contained within a cylindrical space only a little larger in diameter than the armature, and is specially included in the invention. Moreover, the invention includes special features in the matter of the gearing, as follows:

First. Both the field-magnets and the armature are adapted to rotate with or on the car-axle, and the gearing is so disposed that their rotation in opposite directions (or it may be in the same direction at different speeds) imparts motion to the car-axle. Preferably they are both mounted on the driving-axle so as to be supported thereby.

Second. Gearing is employed with intermediates symmetrically disposed with reference to the driving-pinions, so as to balance, more or less, the stress of transmission.

Third. Gearing is employed which can be engaged for the transmission of power to the axle by arresting a movable part, and disengaged by releasing said part. In the ordinary clutch the dog or gripper moves with the part clutched thereby. With what is known as "sun-and-planet gear" (or like gearing) the transmission may be made effective by holding any one of the three parts or elements of the gear from rotation, and on the release of this part (the three parts being now free) the gear revolves idly.

Fourth. The axially-placed armature is directly connected with the car-axle, so as to revolve at the same speed therewith, and the field-magnets are connected with the car-axle through gearing, (or the reverse arrangement may be adopted.)

Fifth. The clutch or gripper for applying and releasing the motive power is preferably combined with a spring or buffer so arranged that when said clutch or gripper is operated to apply the power it acts through said spring or buffer, and thus applies the power without shock or jar. The invention covers this feature generally, as well as when carried out by the improved means hereinafter described.

Sixth. While the invention extends to certain combinations involving a clutch or gripper of any known or suitable construction, the gripper shown in the accompanying drawings possesses special features which conduce to the more efficient operation of the motor mechanism as a whole. This improved gripper being, so far as I am aware, new in itself, is included in the invention separately as well as in combination with other elements of the aforesaid mechanism. It will be hereinafter fully described.

Further, the invention comprises certain inclosing means whereby the motor mechanism is protected from dust and dirt.

In the accompanying drawings, which form part of this specification, Figure I is a partial view, in sectional elevation, of a railway-car provided with motor mechanism constructed in accordance with the invention, the section being taken on line $i$ of Fig. II. Fig. II is a horizontal section on line $i\,i$ of Fig. I. Fig. III is a transverse section on line $i\,i\,i$ of Fig. I. Figs. IV, V, and VI are sections on lines $iv$, $v$, and $vi$, respectively, of Fig. II; and Fig. VII is a horizontal section and plan showing a modified arrangement.

The armature A, composed of a soft-iron strip wound upon itself and provided with bobbins wrapped about the ring thus formed in notches in the edges of said ring, (or it may be an armature of other suitable construction,) has a long hub A' and is, as shown in Figs. I and III, mounted fast on the car-axle B. The extra length of hub might, however, be dispensed with. The armature A is thus not only axially placed with reference to the car-axle B, but it is also mounted thereon. It is directly connected with or coupled to said car-axle through the key or other means for making the armature fast on the axle. The commutator D is fast on the armature-hub A′, or it might be directly on the car-axle. The field-magnets E project from yokes F G at the sides of the armature A, or other suitable arrangement of field-magnets may be adopted. The field-magnets are journaled on the car-axle B at 2 and 3, so that they are free to turn thereon. As shown, the journal-bearings at 2 and 3 are in the yokes F G, which are perforated for the passage of the car-axle. At H K are the commutator-brushes mounted on but insulated from the yoke G. The yokes F G are suitably connected, so as to revolve together, the connection shown being effected by means of cylinders F′ G′, cast or formed integral with yokes F G and a ring L, bolted between flanges on the adjacent ends of said cylinders. The parts F G F′ G′ L thus form a box which incloses the motor. The ring L is preferably of non-magnetic material, as brass, to avoid any effect on the armature. Although it is preferred to make the parts F′ G′ L sufficiently close to exclude dust to a greater or less extent, yet it is evident that so far as the mechanical connection of the yokes F G with each other is concerned such closeness is unnecessary, and also that other forms of connection may be used. The yoke F is provided with a pinion M, which engages the intermediates N, mounted on journal-pins 4 on the disk P, which is journaled on the neck 5, joining the yoke F with the pinion M. The internal gear Q is fast on the car-axle and is engaged by intermediates N, which are symmetrically disposed about the car-axle. The disk P may be held stationary by any means, whether permanent or adapted to be engaged and released at will. As shown, it is adapted to be engaged by means which can be applied at will. These means, as shown, consist of a gripper having two parts or jaws R and R′, which are jointed together by means of the eyebolt 6, and are adapted to be drawn together to clamp the periphery of the disk P or opened to release it. To draw the jaws R R′ together, different devices may be used; but as shown there is a lever S jointed to the lower jaw R′, and a link S′ connecting the lever S and the upper jaw R, so that when said lever is drawn inward the link forces the jaws R R′ together with great pressure. The gripper R R′ is prevented from turning with the disk P by means of an arm 7, which is connected with a part of the car—as the car-body, for example—adapted to hold it from rotating. This arm may be of any desired length, and it is desirable to have it long, since by the increase the stress on the axle when the gripper is on is lessened.

To make the application of the gripper more gradual, springs or buffers are employed at one or both the following points—that is to say, in the connection which holds the gripper from rotating, as at 8, and in one of the connections of the gripper-jaws R R′, as at 9. The spring or buffer 8 (shown as a spiral compression-spring) is interposed between two disks 10 and 11, which are loose in a headed cylinder 12. The stirrup 13, which surrounds the end of arm 7, has a stem 14, with sleeves 15 and 16 fast thereon. These sleeves play through the cylinder-heads. When the arm 7 is lifted, the sleeve 16 presses up to the disk 11 and compresses the spring 8. When the arm 7 is depressed, it carries down the sleeve 15 and disk 10 and compresses the spring. The cylinder 12 is fastened to the car-body. The spring or buffer 9 of, say, soft vulcanized rubber is placed under the nut on the eyebolt 6, which is jointed at the opposite end to the jaw R′. By adjusting the nut 9′ the grip of the jaws may be regulated, and the interposition of the rubber 9 insures that they shall exert an elastic or yielding pressure. When the gripper has taken a firm hold, the spring or buffer 8 prevents the occurrence of a shock. Renewable wearing-surfaces are shown at 17 and 18 in the form of a wooden rim 17 on the disk P and metal shoes 18 on the jaws R R′.

To keep dirt from the gears and to allow them to run in oil, they are inclosed in a gear-box, which, as shown, is formed by adapting the disk P to make a close joint with the gear Q. The lever S may be operated by means of a chain W, extending to the end of the car and wrapped around an upright shaft 19, like the chain of the ordinary car-brake, or by other suitable means. A spring X may be employed to retract the lever S and open the gripper R R′ when the chain W is allowed to unwind from the shaft 19.

The current is supplied to the field-coils and armature-coils of the motor by means of the contacts 20 and 20′, 21 and 21′, and 22 and 22′. The latter of each of these pairs of contacts is in the form of an insulated ring on the hub 26 of yoke G, and the former consists of brushes which are fastened at one end (see Fig. VI) to a two-part ring 24, which is bolted to an arm 25 of non-conductive material, as wood. The wires run from these rings 24 from the reversing-switch. The arm 25 is held from rotation by a connection 27 with the car-body. The object of using three pairs of contacts is so that a reversing-switch may be placed in the loop for the armature or the field, as well understood. The brush K is supposed to be grounded. Any ordinary or suitable current-regulating means may be used with the motor.

The operation of the motor mechanism is as follows: In starting the car the current may be put on by the rheostat or otherwise after the gripper R R′ is applied. In that case the electricity tends to turn the field-magnets backward and the armature forward.

The torque on the field-magnets is transmitted to the pinion M and from this through the intermediates N on the disk P (which latter is held stationary by the gripper R R') to the internal gear Q and axle B in the direction to rotate the car-axle forward or in the direction in which it is desired the car to go. The field-magnets E turning backward or in the opposite direction to the armature A, the effective movement of the motor is proportional to the forward motion of the armature in addition to the backward motion of the field-magnets. The direct torque or reaction between the armature and field-magnets is of course multiplied correspondingly in the transmission to the car-axle. In order to start the car, it is not necessary, however, to apply the gripper R R' before turning on the current. The latter may be applied first, and its effect then is to rotate the field-magnets backward. On applying the gripper the momentum tends to continue this movement, which is transmitted to the internal gear Q and car-axle in the direction to move the car forward. Owing to the construction of the gripper, as already explained, the application of the power to start the car is very gradually effected. It will further be perceived that as the gripper is applied and the revolution of the field-magnets is decreased the counter electro-motive force diminishes and the current increases automatically until it, aided by the momentum of the field-magnets, suffices to start the car. In stopping the car the current may be cut off, or it may be allowed to continue, and the release of the gripper R R' will permit the field-magnets to rotate idly and the car to be stopped by means of brakes or otherwise. To allow the car to coast or to run by its own momentum, the gripper R R' need only be released.

Instead of having the field-magnets connected with the pinion M, the armature may be connected therewith, as illustrated in Fig. VII, the field-magnets being keyed at 28 on the car-axle with the gear Q. It will be understood that this reverse arrangement is included in the invention as a substitute for that first described without further specification herein. Of the three parts or elements of the gearing shown—namely, the pinion M, disk P, with intermediates N, and gear Q—the gripper might be applied to any one, the other two being connected one with the armature and the second with the field-magnets. It is not necessary to use an internal gear, since outside gears only might be used, and various other modifications in the gearing could be made without departing from the invention, some parts of the said invention admitting of wider range of modification than others.

Instead of applying the motor mechanism, as shown, to a car-axle, it might be applied to any shaft which it is desired to run.

Having fully described my invention, what I claim as new, and desire to secure by Letters Patent, is—

1. The combination, with a car, of a propelling-motor connected with the driving-axle by means of sun-and-planet gearing adapted to be engaged or allowed to run idly by arresting or freeing a movable part, and an adjustable gripper for said part having a spring or buffer through which the said gripper is held from rotation, so that when the gripper is applied it arrests the said part with yielding resistance, substantially as set forth.

2. The combination, with a car, of a propelling-motor connected with a driving-axle through gearing, such as sun-and-planet gear, adapted to be engaged or allowed to run idly by arresting or freeing a movable part, and a gripper for said part composed of jaws one at least of which has a projection by which it is secured to a part of the car-body adapted to prevent the rotation of the gripper, and a spring or yielding connection by which said projection is held, substantially as described.

3. A gripper composed of jaws one at least of which has a projection by which it is held from rotation, and a spring or buffer through which said projection is held, substantially as described.

In testimony whereof I have signed this specification in the presence of two subscribing witnesses.

ELBERT B. PHILLIPS.

Witnesses:
   A. B. CALHOUN,
   W. A. PALLANT.